April 5, 1949.                    M. GERARDIN                    2,466,411
                         APPARATUS FOR TAKING CINEMATOGRAPHIC
                         PICTURES ON CONTINUOUSLY FED FILM
Filed May 5, 1947                                          3 Sheets-Sheet 1

April 5, 1949.  M. GERARDIN  2,466,411
APPARATUS FOR TAKING CINEMATOGRAPHIC
PICTURES ON CONTINUOUSLY FED FILM
Filed May 5, 1947  3 Sheets-Sheet 2

April 5, 1949.	M. GERARDIN	2,466,411
APPARATUS FOR TAKING CINEMATOGRAPHIC
PICTURES ON CONTINUOUSLY FED FILM
Filed May 5, 1947	3 Sheets-Sheet 3

Inventor
Maurice Gerardin

Patented Apr. 5, 1949

2,466,411

UNITED STATES PATENT OFFICE 2,466,411

APPARATUS FOR TAKING CINEMATOGRAPHIC PICTURES ON CONTINUOUSLY FED FILM

Maurice Gérardin, Grenoble, France, assignor to Société pour l'Exploitation des Brevets M. G. D., Grenoble, France Application May 5, 1947, Serial No. 746,016
In France May 16, 1946

6 Claims. (Cl. 88—16.8)

This invention relates to cinematographic cameras of the continuously moving type, and particularly to the type in which each of the collective lenses comes in turn behind and coaxial with the fixed objective lens, the film being internal to the rotatable drum supporting the collective lenses.

With such an aim, another object of this invention is to provide a camera in which a perfect synchronism is procured between the movement of the film and the movement of the collective lenses without necessitating the mechanical accuracy and precision of the different parts.

Another object of this invention is to provide a camera in which the combination of the optical system and the mechanical device allows great speed of rotation without causing exaggerate centrifugal stress of the mechanical parts, excessive speed for the film and lack of luminosity.

The type of camera in which the invention is embodied is provided with a system in which each of the collective lenses, located at the periphery of a drum rotatably mounted, comes in turn behind and coaxial with the fixed objective system, the film being in the interior part of the drum supporting the lens, in contradistinction to apparatus previously known in which the film is external to said drum, such device causing excessive centrifugal stresses and excessive film speed, and, for a standard film, involving the use of lenses of too small dimensions and of too reduced field.

In combination with such a system, the optical device is such that the primary image, given by the objective lens, is located on the axis of rotation of the drum, which particularly allows the driving of the film directly by the drum without interposition of a gear of any kind, the angular speed of the drum and of the film being the same, thus permitting a perfect synchronization of the two movements.

The device according to an embodiment of the present invention comprises a drum provided with internal teeth which cooperate with perforations in the film with a view to drive the same, the driving and guiding action of the teeth being only exerted on the film in the vicinity of the point where the image is formed.

The film is perfectly guided by a shoe or film gate in which slots are preferably provided for accommodation therethrough of the teeth of the drum.

The invention can be better understood by reference to the attached drawing representing one method of construction of a picture camera according to the invention and given purely as an example without any implied restriction or limitation.

On this drawing:

Fig. 1 represents a part sectional elevation of the said camera, of which;

Figure 1:
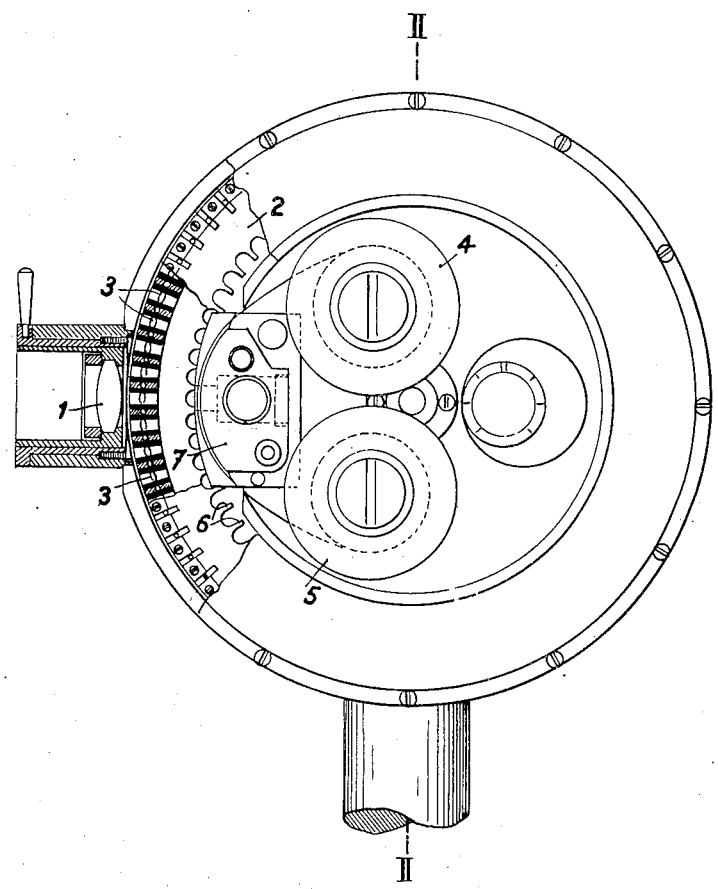
Figure 2:
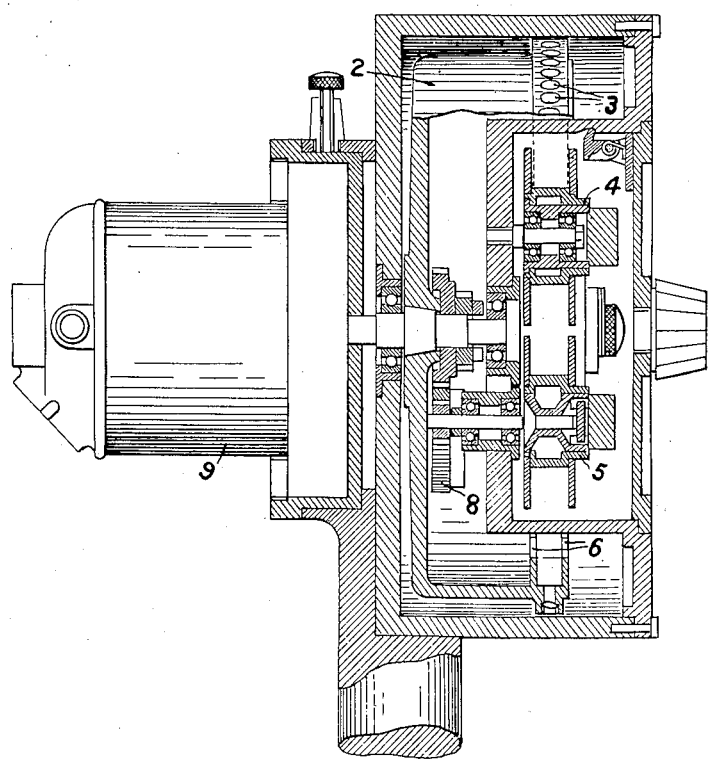
Fig. 2 represents a part section taken on the line II—II of Fig. 1.
Figure 3:
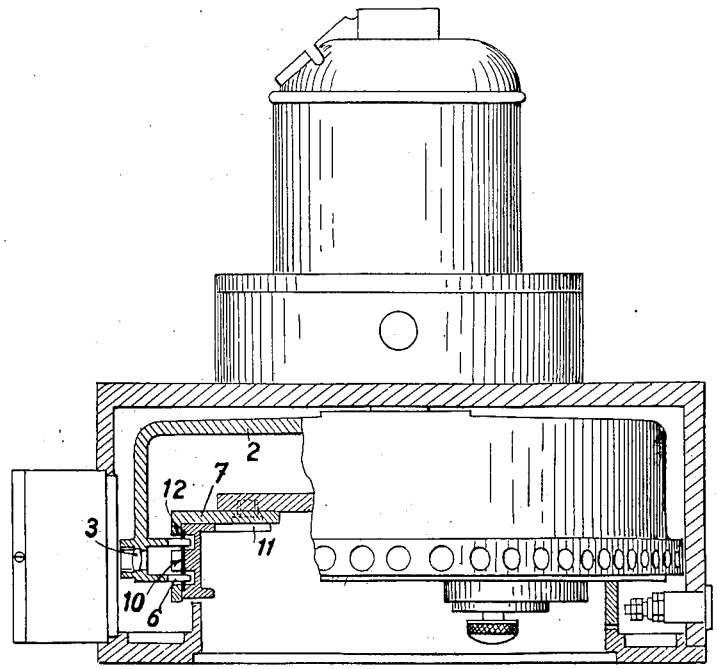
Fig. 3 represents a part section according to a horizontal plane determined by the axis of the fixed lens and the axis of the rotatable drum.

On this diagram 1 is shown as representing the fixed primary objective, here in the form of a simple bi-convex lens 2 representing the rotating drum on which are mounted the moving secondary objectives 3; 4 represents the spool of unexposed film and 5 the winding spool of the exposed film; 10 represents the film.

The primary image is formed in the plane show by II—II and has its centre on the optical axis of the primary lens 1. It is brought back in the plane of movement of the film and moved at the same speed and in the same direction as the latter, by the moving secondary objectives 3, at the instant of their passage through the field of the fixed primary objective 1.

Perfect synchronism between the unwinding of the film and the rotation of the drum is procured by the film being drawn through by the drum 2 itself by means of the teeth 6 placed on the interior of the drum and penetrating the perforations in the film, drawing it into place for its motion through the field of the objectives.

Figure 4:
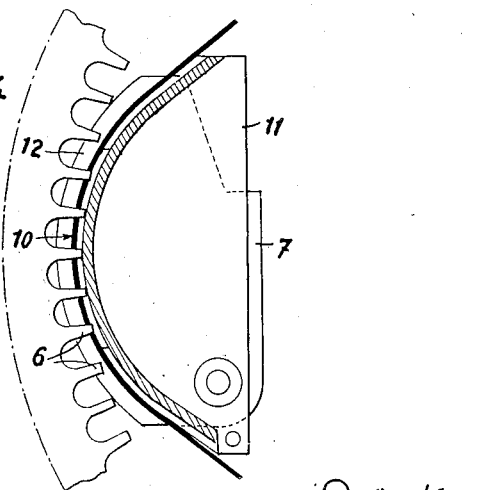
Fig. 4 represents a part section through the film guiding shoe and showing the manner in which said film is guided and driven.

For this purpose, the film 10 passes through a specially shaped shoe 7 (see Fig. 4) on which is mounted a pivoting piece 11 so disposed as to maintain the film at a correct distance from the lenses. On the fixed part 7 of the shoe, notches 12 are provided in which the teeth 6 of the rotatable drum are turning, said teeth engaging the perforations of the film 10. Thus, the film is driven only in the vicinity of the point where the image is formed and with the same angular speed as the secondary lenses 3.

The spools, the objectives and the shoe are seen to be all in the same plane and inside the drum 2 so that no twisting occurs in the film.

The winding spool 5 is driven by the drum 2 through a gear train 8.

The functioning of the arrangement can thus be easily seen. When the optical system has been correctly set for the photographs to be taken, and the unexposed film on spool 4 has been threaded on spool 5 after passing across the shoe 7 in such a way as to have the perforations engaged with the teeth 6 the motor 9 is started and rotates the drum 2 and thereby the winding spool 5.

During the passage of each of the moving objectives 3 across the field of the primary objective 1, the portion of film corresponding to the moving objective is exposed.

Where there is a possibility of slight differences in form of the moving objectives 3, these can each be independently set and each image will keep the same quality of clearness.

It is obvious that various forms of construction can be used and that similar systems of winding, feeding and optical adjustment can be evolved without thereby departing from the general spirit of the present invention.

What I claim is:

1. In a continuous motion picture camera in combination a camera casing; an opening in the wall of said camera casing; an objective lens combined with said opening; a film transporting lens drum rotatably supported within said camera casing behind said opening; a continuous row of compensating lenses arranged along the outer periphery of said film transporting lens drum; a stationary film gate arranged within said camera casing inside said film transporting lens drum; a film supply spool rotatably mounted within said camera casing inside said film transporting lens drum; a film take-up spool also rotatably mounted within said camera casing inside said film transporting lens drum; motion transmitting means for rotating said take-up spool arranged also within said camera casing inside said film transporting lens drum; a continuous row of transporting teeth arranged on the inner periphery of said film transporting lens drum projecting inwardly so as to be adapted to engage the perforations of a film strip while the same is passing through said stationary film gate supported by the same and to thus transport said film strip in synchronism with its own rotation; and combined driving means for simultaneously rotating said film transporting lens drum and operating said motion transmitting means for rotating said take-up spool.

2. In a continuous motion picture camera in combination a camera casing; an opening in the wall of said camera casing; a film transporting lens drum rotatably supported within said camera casing; an objective lens in said opening in said wall of said camera casing; a continuous row of compensating lenses arranged along the outer periphery of said film transporting lens drum, said objective lens and said compensating lenses being constructed and shaped so as to form an image of the object the picture of which is taken in the center of said film transporting lens drum; a stationary film gate arranged within said camera casing inside said film transporting lens drum; a film supply spool rotatably mounted within said camera casing inside said film transporting lens drum; a film take-up spool also rotatably mounted within said camera casing inside said film transporting lens drum; motion transmitting means for rotating said take-up spool arranged also within said camera casing inside said film transporting lens drum; a continuous row of transporting teeth arranged on the inner periphery of said film transporting lens drum projecting inwardly so as to be adapted to engage the perforations of a film strip while the same is passing through said stationary film gate supported by the same and to thus transport said film strip in synchronism with its own rotation; and combined driving means for simultaneously rotating said film transporting lens drum and operating said motion transmitting means for rotating said take-up spool.

3. In a continuous motion picture camera in combination a camera casing; an opening in the wall of said camera casing; an objective lens combined with said opening; a film transporting lens drum rotatably supported within said camera casing behind said opening; a continuous row of compensating lenses arranged along the outer periphery of said film transporting lens drum; a stationary film gate arranged within said camera casing inside said film transporting lens drum; parallel slots arranged within said film gate spaced from each other in direction of the film strip passing through said film gate so as to be located under the perforations of the same; a film supply spool rotatably mounted within said camera casing inside said film transporting lens drum; a film take-up spool also rotatably mounted within said camera casing inside said film transporting lens drum; motion transmitting means for rotating said take-up spool arranged also within said camera casing inside said film transporting lens drum; a continuous row of transporting teeth arranged on the inner periphery of said film transporting lens drum projecting inwardly so as to be adapted to reach into said slots in said stationary film gate and to engage the perforations of said film strip passing through said stationary film gate supported by the same and to thus transport said film strip in synchronism with the rotating movement of said compensating lenses; and combined driving means for simultaneously rotating said film transporting lens drum and operating said motion transmitting means for rotating said take-up spool.

4. In a continuous motion picture camera in combination a camera casing; an opening in the wall of said camera casing; a film transporting lens drum rotatably supported within said camera casing; an objective lens in said opening in said wall of said camera casing; a continuous row of compensating lenses arranged along the outer periphery of said film transporting lens drum, said objective lens and said compensating lenses being constructed and shaped so as to form an image of the object the picture of which is taken in the center of said film transporting lens drum; a stationary film gate arranged within said camera casing inside said film transporting lens drum; parallel slots arranged within said film gate spaced from each other in direction of the film strip passing through said film gate so as to be located under the perforations of the same; a film supply spool rotatably mounted within said camera casing inside said film transporting lens drum; a film take-up spool also rotatably mounted within said camera casing inside said film transporting lens drum; motion transmitting means for rotating said take-up spool arranged also within said camera casing inside said film transporting lens drum; a continuous row of transporting teeth arranged on the inner periphery of said film transporting lens drum projecting inwardly so as to be adapted to reach into said slots in said stationary film gate and to engage the perforations of said film strip passing through said stationary film gate supported by the same and to thus transport said film strip in synchronism with the rotating movement of said compensating lenses; and combined driving means for simultaneously rotating said film transporting lens drum and operating said motion transmitting means for rotating said take-up spool.

5. In a continuous motion picture camera in combination a camera casing; an opening in the wall of said camera casing; an objective lens combined with said opening; a film transporting lens drum rotatably supported within said camera casing behind said opening; a continuous row of compensating lenses arranged along the outer periphery of said film transporting lens drum; a stationary film gate arranged within said camera casing inside said film transporting lens drum; film supplying means mounted within said camera casing; film take up means mounted also within said camera casing; film engaging means arranged on the inner periphery on said film transporting lens drum so as to be adapted to engage said film strip while the same is passing through said stationary film gate supported by the same and to thus transport said film strip in synchronism with its own rotation; and driving means for rotating said film transporting lens drum.

6. In a continuous motion picture camera in combination a camera casing; an opening in the wall of said camera casing; an objective lens combined with said opening; a film transporting lens drum rotatably supported within said camera casing behind said opening; a continuous row of compensating lenses arranged along the outer periphery of said film transporting lens drum; film supplying means mounted within said camera casing; film take up means rotatably mounted within said camera casing; motion transmitting means for rotating said film take up means rotatably mounted within said camera casing; film engaging means arranged on the inner periphery of said film transporting lens drum so as to be adapted to engage said film strip while the same is passing said objective lens, and to thus transport said film strip in synchronism with its own rotation; and combined driving means for simultaneously rotating said film transporting lens drum and operating said motion transmitting means for rotating said film take up means.

MAURICE GÉRARDIN.

REFERENCES CITED

The following references are of record in the file of this patent:

UNITED STATES PATENTS

| Number | Name | Date |
|---|---|---|
| 1,316,669 | Bardy | Sept. 23, 1919 |
| 1,751,702 | Like | Mar. 25, 1930 |
| 1,928,088 | Bledowski | Sept. 26, 1933 |
| 1,943,689 | Moreno | Jan. 16, 1934 |
| 2,088,536 | Ryland | July 27, 1937 |